United States Patent [19]

Ham et al.

[11] Patent Number: 4,613,518

[45] Date of Patent: Sep. 23, 1986

[54] MONOLITHIC CAPACITOR EDGE TERMINATION

[75] Inventors: Mooyoung Ham, Glens Falls; John W. Duffy, Saratoga Springs, both of N.Y.

[73] Assignee: SFE Technologies, San Fernando, Calif.

[21] Appl. No.: 691,025

[22] Filed: Jan. 14, 1985

Related U.S. Application Data

[63] Continuation of Ser. No. 600,618, Apr. 16, 1984, abandoned.

[51] Int. Cl.⁴ .............................................. B05D 5/12
[52] U.S. Cl. .................................... 427/38; 29/25.42; 15 C/633; 15 C/643; 361/309; 427/79; 427/81; 427/124; 427/438; 427/423
[58] Field of Search ................. 427/38, 79, 81; 29/25, 29/42; 156/632, 633, 643, 656; 361/306, 308, 309

[56] References Cited

U.S. PATENT DOCUMENTS

| | | | |
|---|---|---|---|
| 1,758,473 | 5/1930 | Schoop | 427/423 |
| 3,284,684 | 11/1966 | Gaenge | 361/309 |
| 3,891,901 | 6/1975 | Booe et al. | 361/309 |
| 3,992,761 | 11/1976 | McElroy et al. | 361/309 |
| 4,102,021 | 7/1978 | Nakao et al. | 427/79 |
| 4,226,011 | 10/1980 | Hunt | 427/79 |
| 4,504,884 | 3/1985 | Vetter | 361/309 |

*Primary Examiner*—John H. Newsome
*Attorney, Agent, or Firm*—Christie, Parker & Hale

[57] ABSTRACT

Edge termination of monolithic capacitors having thin electrode layers bonded in dielectric resin is accomplished by ashing away some resin to expose electrode edge surfaces, plating the edge surfaces by vapor deposition, and depositing a conductive layer on the coating by electroless plating, schooping or applying conductive epoxy.

7 Claims, 9 Drawing Figures

MONOLITHIC CAPACITOR EDGE TERMINATION

This is a continuation of application Ser. No. 600,618, filed 4/16/84, and now abandoned.

This invention relates generally to completing the construction of electrical capacitors and more particularly concerns making termination connections to the electrode layers of monolithic capacitors.

This application is a continuation of U.S. application Ser. No. 600,618, filed Apr. 16, 1984, now abandoned.

It has become possible to make miniature monolithic capacitors having alternate layers of electrode material and dielectric material adding up to thousands of layers but with each layer being very thin. U.S. patent application Ser. No. 562,779, filed Dec. 19, 1983, on Miniaturized Monolithic Multilayer Capacitor and Apparatus and Method for Making, hereby incorporated by reference, discloses capacitors in which the electrode layers defining the plates of the capacitor are 200-500 angstroms thick, and the electrode layers are separated by dielectric coatings about one micron thick. Edge termination of such a capacitor structure is difficult because there is virtually no edge to such extremely thin electrode layers and, if the layers are partially exposed, they are structurally weak.

Accordingly, it is an object of the invention to provide an improved method of edge termination that is well suited for miniature monolithic capacitors having very thin electrode layers and resin dielectric. A collateral object is to provide an edge termination structure for such capacitors having desirable strength and electrical contact characteristics.

An object of the invention is to provide a method as characterized above that functions with a high degree of reliability. It is also an object to provide such a method that is relatively inexpensive in that economical materials can be used and elaborate out-of-the-ordinary equipment is not required.

Other objects and advantages of the invention will become apparent upon reading the following detailed description and upon reference to the drawings, in which.

While the invention will be described in connection with preferred embodiments, it will be understood that we do not intend to limit the invention to those embodiments. On the contrary, we intend to cover all alternatives, modifications and equivalents as may be included within the spirit and scope of the invention as defined by the appended claims.

Figure 1:
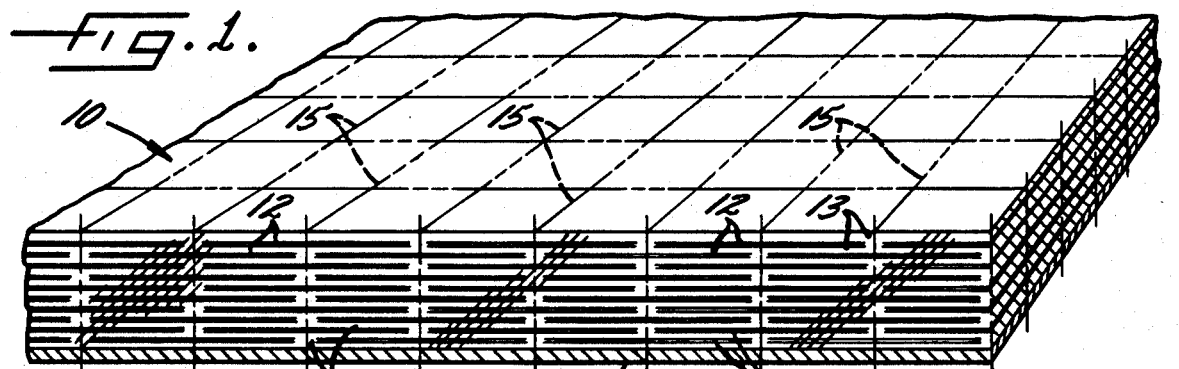
FIG. 1 is a fragmentary schematic perspective of a capacitor sheet from which capacitors are formed for treatment by the invention.
Figures 2, 3:
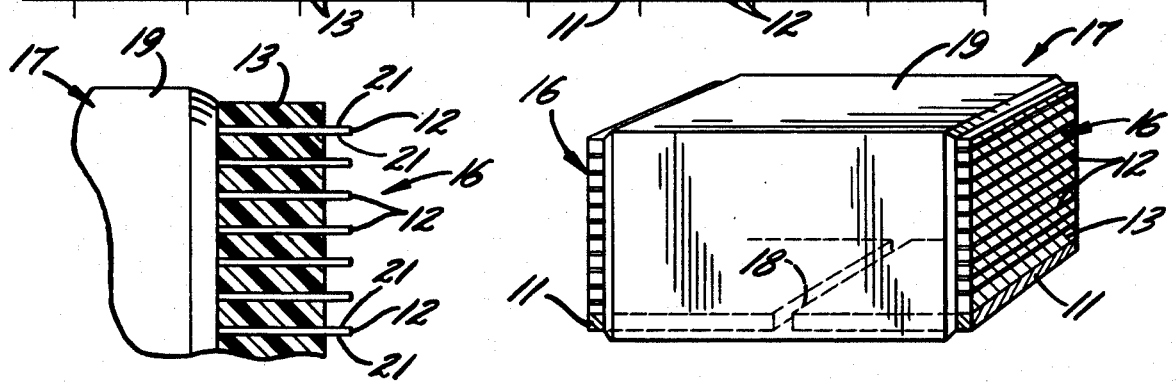
FIG. 2 is a perspective of a single capacitor cut from the sheet of FIG. 1 prior to edge termination.
FIGS. 3, 4 and 5 are fragmentary sections showing a portion of one edge of the capacitor of FIG. 2 at successive steps of the process.
Figure 4:
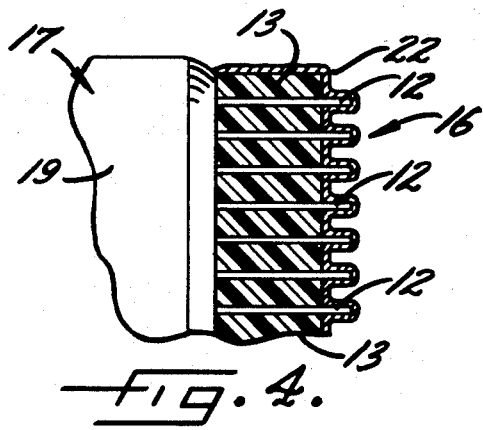
Figure 6:
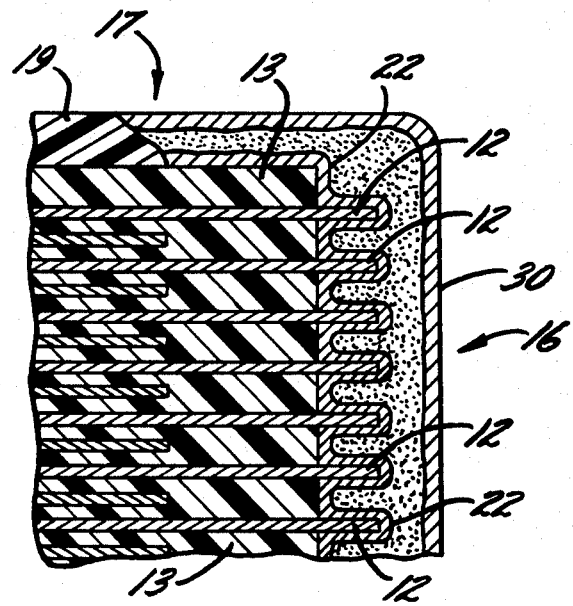
FIG. 6 is a schematic end section of the completed edge termination.
Figure 5:
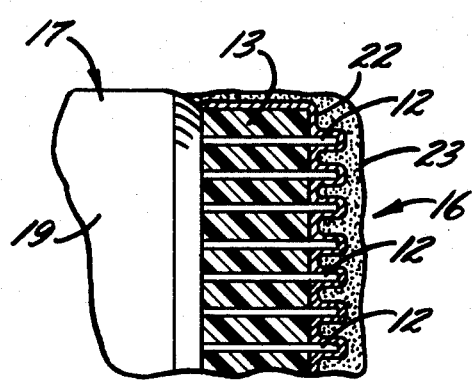

Turning to the drawings, there is shown in FIG. 1 a sheet 10 of capacitor material comprising a conductive substrate 11, layers 12 of electrode material laid down in strips having a staggered overlying relation, and cured dielectric resin 13 surrounding and bonding the electrode layers together. Methods and apparatus which can be used to form such a sheet are disclosed in said application Ser. No. 562,779.

The exemplary sheet 10 sketched in FIG. 1 has only ten electrode layers, resulting in only five electrode pairs. As explained in said application, the electrode layers are 200-500 angstroms thick, separated by resin coating approximately one micron thick, so that an actual capacitor sheet can be built up of thousands of electrode layers.

To form a capacitor from the sheet 10, the sheet is cut along lines 15 which define the capacitor edges 16 to be terminated, and a cross cut is made to form a capacitor block 17 of the desired size. As working examples, blocks processed were about 14 millimeters between the edges 16, with the edges being approximately 5 millimeters wide and 1 millimeter thick, and exposing 500 aluminum electrode layers at each edge of about 250 angstroms thick. The substrate 11 was copper about 1.5 microns thick and the resin 13 separated the electrode layers about 1 to 1.5 microns.

In forming the capacitor, the substrate 11 is notched at 18 completely across the capacitor width to electrically separate the capacitor edges 16. Preferably, the body of the capacitor is coated with a thin coating of epoxy 19 as a passivation layer and moisture barrier, and the resulting capacitor body is dried at an elevated temperature to remove residual water. In the examples, a drying cycle of 13 hours at 60° C. was effective for this purpose.

In accordance with the invention, the edges 16 are ashed in an oxygen plasma to remove, as by etching, dielectric material between the layers 12 to expose narrow electrode surfaces 21, a film 22 of nickel is vapor deposited on the edges 16 so as to coat these narrow surfaces, and a layer 23 of protective conductive material is deposited on the coating 22. Ashing is done in a vacuum environment, approximately $3 \times 10^{-1}$ Torr was used in the examples, and an oxygen plasma created for the ashing step burns away, i.e., removes by etching, the resin exposed to it. In the examples, a 50 Watt plasma generated at 100 kilohertz in the vacuum stated above removed about 1 micron of resin in 30 minutes.

After ashing, the thin coating 22 of nickel is vapor deposited on the edges 16 to establish reliable electrical connections between the electrodes 12 and to strengthen the exposed electrode ends defining the surfaces 21. Nickel is selected as it is economical, compatible with aluminum, strong, conductive and also compatible with the following step. The vapor deposition is done conventionally in a vacuum environment, and in the examples the resulting coating was 1000-1500 angstroms thick.

Figure 7:
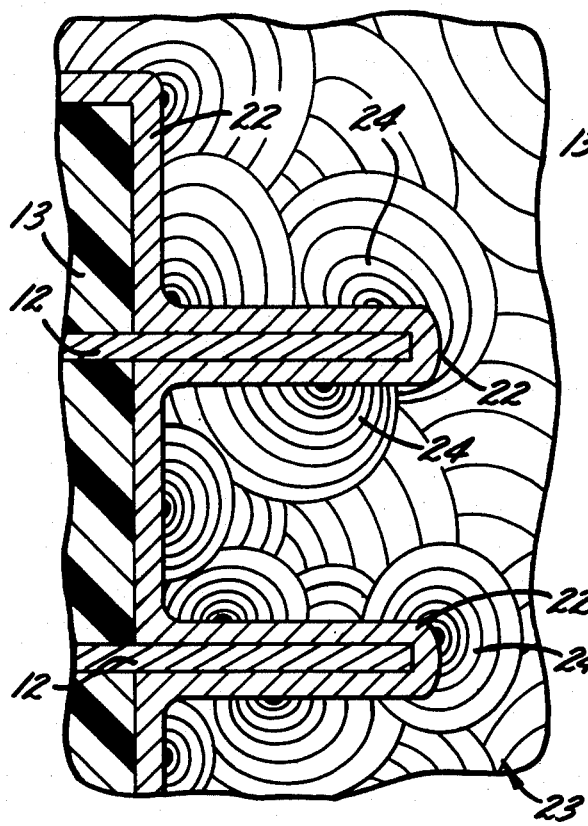
FIGS. 7, 8 and 9 are diagrammatic representations of three alternate edge termination processes contemplated by the invention.

Three techniques of forming the protective layer 23 of conductive material are contemplated. The layer 23 can be deposited by electroless plating; that is, placing the edges 16 in a bath of dissolved nickel solution. A layer approximately 3.5 microns thick was built up as suggested in FIG. 7 by, in the examples discussed, placing the edges 16 in a 1000 milliliter bath of Shipley Niposit 468 for 15 minutes at 70° C. After plating, the examples were rinsed with distilled water and vacuum dried at $10^{-5}$ Torr. In FIG. 7, the layer 23 is shown being formed by the growth of nickel layers 24.

While electroless plating is particularly convenient, other methods are workable. Conductive epoxy may be applied to produce the layer 23 as suggested in FIG. 9 wherein conductive particles 25 in the epoxy make the protective layer conductive. In the examples, epoxies identified as Amicon CT-2523 and Amicon C-150-1 were hand-applied and heat cured.

Figure 8:
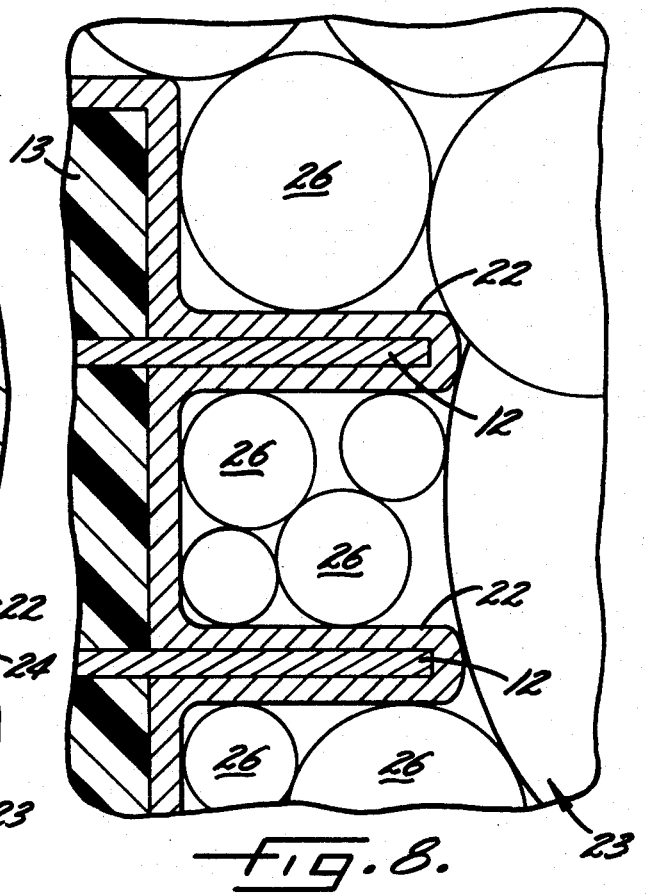

Alternatively, the conductive layer 23 can be formed, as suggested by FIG. 8, by conventional zinc schooping, the technique of metal coating used to edge-terminate metallized film capacitors. In the examples, a zinc layer 15 mils thick was built up using a standard schooping procedure in which electrodes were arced at 19 volts, direct current, and 140 amps, and the metal was directed by nitrogen at 75 psi across an 8 inch arc-to-target spacing. In FIG. 8, the zinc particles 26 deposited by schooping maintain the conductivity of the coating 23.

Pursuant to the invention, the edge termination structure includes the layer 23, with its outer surface defining the electrical termination surface for the capacitor face 16, which is electrically and physically connected to the narrow surfaces 21 of the electrodes 12 that extend from the resin approximately perpendicular to the outer terminal surface by a film or coating 22 of metal. The fragile ends of the electrodes 12 defining the surfaces 21 are thus associated with the essentially perpendicular layer 23 by the intermediate coating film 22. This connection is thus physically strong as well as electrically sound.

Figure 9:
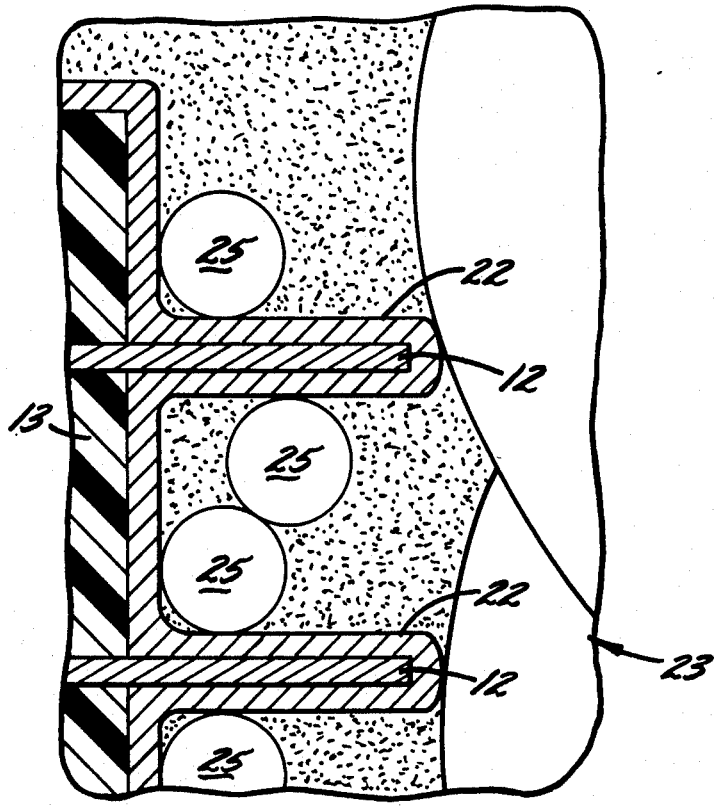

In each of the cases, of FIGS. 7, 8 or 9, the conductive layer 23 establishes conductivity between the coating 22 and the capacitor face 16 while covering and protecting the exposed edges of the electrode layers 12 and the coating 22.

Following the deposit of the layer 23, the edges may be coated with a covering layer 30 of tin, either by vapor deposition or by schooping, or the edges 16 can be directly connected to suitable leads or connections. All of the electrode layers 12 are then in good electrical contact with the final edge termination structure.

It will be understood that the foregoing description is only of certain preferred embodiments, and the invention is to be determined by giving the following claims their proper scope and interpretation.

We claim as our invention:

1. The method of edge termination for a monolithic capacitor in which the electrode layers are bonded in spaced relation by dielectric resin comprising the steps of ashing the substantially planar capacitor edge in an oxygen plasma to remove dielectric between the electrode layers and expose narrow electrode surfaces, vapor depositing a film of metal onto said edges so as to coat and electrically connect said narrow electrical surfaces, and overlaying a layer of conductive material onto said metal coating.

2. The method of claim 1 in which said electrode layers are aluminum and said metal is nickel.

3. The method of claim 1 in which said overlaying step involves immersing said coating edge in an electroless bath of dissolved nickel.

4. The method of claim 1 in which said overlaying step involves coating said material with a conductive epoxy, and curing said epoxy.

5. The method of claim 1 in which said overlaying step involves schooping the metal coating with zinc.

6. The method of claim 1 in which the layer of conductive material is covered by a film of tin.

7. In a miniature monolithic capacitor having electrode layers about 200 to 500 angstroms thick bonded in spaced relation by dielectric resin layers about one to one and a half microns thick, an edge termination structure comprising, in combination, an outer layer of electrically conductive material having one surface exposed to define an electrical termination surface, said electrode layers extending from said resin layers and defining narrow electrode surfaces disposed approximately perpendicular to said termination surface, and a film of metal disposed between and coating both said narrow electrode surfaces and said layer of conductive material so as to electrically and physically connect the same.

* * * * *